United States Patent
Lee et al.

(10) Patent No.: US 7,496,156 B2
(45) Date of Patent: Feb. 24, 2009

(54) RECEIVER HAVING DIGITAL TIMING RECOVERY FUNCTION

(75) Inventors: U Sang Lee, Kyungki-do (KR); Tah Joon Park, Kyungki-do (KR); Kwang Mook Lee, Seoul (KR); Sang Hyun Min, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 597 days.

(21) Appl. No.: 11/330,212

(22) Filed: Jan. 12, 2006

(65) Prior Publication Data
US 2006/0222114 A1 Oct. 5, 2006

(30) Foreign Application Priority Data
Mar. 29, 2005 (KR) .................. 10-2005-0026146

(51) Int. Cl.
*H04L 27/00* (2006.01)
(52) U.S. Cl. ................................... 375/326
(58) Field of Classification Search .................. 375/326
See application file for complete search history.

(56) References Cited

U.S. PATENT DOCUMENTS

| 6,600,793 B1 | 7/2003 | Grundvig et al. |
| 6,747,826 B2 | 6/2004 | Ohta et al. |
| 2003/0031275 A1* | 2/2003 | Min et al. .................. 375/326 |
| 2003/0053559 A1* | 3/2003 | Chen .......................... 375/316 |
| 2007/0253471 A1* | 11/2007 | Wilhelmsson et al. ....... 375/150 |

FOREIGN PATENT DOCUMENTS

| JP | 2002-26864 A | 1/2002 |
| KR | 10-2005-3663 A | 1/2005 |

* cited by examiner

*Primary Examiner*—Juan A Torres
(74) *Attorney, Agent, or Firm*—McDermott Will & Emery LLP

(57) ABSTRACT

The invention relates to a receiver having a digital timing recovery function. The receiver of the invention detects frequency offset of a received signal by using symbol correlation between the received signal and a reference signal, and increases/decreases the number of data samples according to the detected frequency offset, thereby recovering symbol timing of the received signal.

6 Claims, 6 Drawing Sheets

(a)

(b)

RECEIVER HAVING DIGITAL TIMING RECOVERY FUNCTION

CLAIM OF PRIORITY

The present application is based on and claims priority from Korean Application Number 2005-26146, filed Mar. 29, 2005, the disclosure of which is hereby incorporated by reference herein in its entirety.

BACKGROUND OF THE INVENTION

1. Field of the Invention

The present invention relates to an IEEE 802.15.4 receiver in use for ZigBee communication and so on, and more particularly, an IEEE 802.15.4 receiver having a digital timing recovery function, which can detect frequency offset of a received signal by using symbol correlation between the received signal and a reference signal, and then recover symbol timing of the received signal according to the degree of the detected offset.

2. Description of the Related Art

In general, IEEE 802.15.4 refers to standards for Low-Rate Wireless Personal Area Network (LR-WPANs). IEEE 802.15.4 is a communication system which divides frequency band into three (3) sub-bands, and sets up spreading policies and data rates different according to the sub-bands. IEEE 802.15.4 which targets small-sized, low power and low cost products is directing attention from local area communication markets, which provide wireless networking of about 10 to 20 m distance to houses or offices, and as a key technology for ubiquitous computing that is currently getting popular.

According to IEEE 802.15.4, data is transmitted/received by using shift type symbol waveform coding, which will be described in brief as follows: A transmitting part maps 4 bit data to one of preset 16 symbols (i.e., 4 bit data needs 16 ($2^4$) symbols) and transmits 32 chip signals of the mapped symbol on an RF signal. Then, a receiving part clears off carrier wave from the RF signal, demodulates the RF signal into chip signals through AD conversion, collects the 32 chip signals into a symbol, and recovers original data by correlating the collected symbol with a reference symbol.

FIG. 1 is a block diagram of a conventional IEEE 802.15.4 receiver. Referring to FIG. 1, the conventional receiver includes an analog/digital converter (ADC) 11 for converting an analog signal, which is obtained by clearing off carrier wave from an RF signal, into a digital signal according to a predetermined sampling frequency, a demodulator 12 for demodulating the digital signal, a correlator array 13 for generating correlation value according to 16 symbols through symbol-by-symbol correlation on a chip signal demodulated by the demodulator 12 and a symbol detector 14 for detecting a symbol having the maximum value out of correlation value generated by the correlator array 13.

The afore-described receiver essentially has to execute symbol synchronization in order to detect correct symbols. Examples of such symbol synchronization can include various technologies such as early-late gate technology, digital Phase Lock Loop (PLL) technology and Delay Lock Loop (DLL) technology.

Various conventional synchronization techniques like this have similarity in that they generally achieve synchronization with a received signal by extracting an original clock component from the received signal using a complicated differential circuit, or controlling the sampling frequency of a Voltage Controller Oscillator (VCO) by comparison of the extracted clock component with an internal reference clock.

In particular, FIG. 1 shows an IEEE 802.15.4 receiver block having a symbol synchronization circuit based upon early-late gate technique of conventional synchronization techniques. In FIG. 1, a symbol synchronization circuit 20 includes two integrators 21 and 22 for integrating an output signal from the demodulator 12 in two different integration ranges, a comparator 23 for comparing two integral values from the two integrators 21 and 22, a filter 24 for filtering an output value from the comparator 23 and a Voltage Control Oscillator (VCO) 25 for regulating sampling frequency according to an output value from the filter 24.

The operation of the symbol synchronization circuit 20 will now be described with reference to FIG. 2. An output signal from the demodulator 12 (see FIG. 1) is integrated according to different integration ranges by the two integrators 21 and 22 (see FIG. 1). With a synchronized output signal S12, integration ranges R11 and R21 by the two integrators 21 and 22 become equal as shown in FIG. 2(*a*), such that the comparator 23 (see FIG. 1) outputs 0. On the other hand, with an unsynchronized output signal S12, an integration range R12 by the integrator 21 decreases by a certain value Δ as shown in FIG. 2(*b*). Referring to FIG. 2(*b*), an integration range R22 by the integrator 22 is larger than the integration range R12 by the first integrator 12, such that the comparator 23 outputs a negative value. When the output value from the comparator 23 is applied to the VCO 25 (see FIG. 25) via the filter 24 (see FIG. 1), the VCO 25 corrects oscillation frequency and phase in such a fashion that this phase difference can be corrected, and provides corrected output value to the ADC 11, such that synchronization can be enabled.

Other conventional symbol synchronization circuits such as PLL and DLL symbol synchronization circuits, through comparison of a received signal clock with an internal clock, apply a difference between the clocks to a VCO to adjust oscillation frequency and phase so that the VCO can be synchronized.

In the conventional symbol synchronization circuits using for example early-late gate technique, in order to extract clock components and compare signals, complicated synchronization circuit elements including an integrator, multiplier, a comparator and so on are required in addition to the receiving circuit. This as a result makes entire receiver structure sophisticated and increases the manufacturing cost as well.

SUMMARY OF THE INVENTION

The present invention has been made to solve the foregoing problems of the prior art and it is therefore an object of the present invention to provide an IEEE 802.15.4 receiver having a digital timing recovery function, which can detect frequency offset of a received signal by using symbol correlation between the received signal and a reference signal, and increase/decrease the number of data samples according to the detected frequency offset, thereby recovering symbol timing of the received signal.

In order to realize the object, the present invention provides a receiver having a digital timing recovery function, comprising: an analog-digital converter for sampling and converting a received analog signal at a predetermined sampling time period into a digital signal; a differential operator for delaying the digital signal for a sampling time interval to produce conjugate complex number of the delayed signal and multiplying the digital signal by the conjugate complex number; a first correlator for multiplying an output signal from the differential operator by conjugate complex number of a preset first reference symbol to produce first correlation value; a frequency offset detector for producing an imaginary part from the first correlation value and adding the imaginary part during a preamble field interval of the received analog signal to detect entire frequency offset in the preamble field interval; a timing controller for controlling timing recovery of the received signal according to the magnitude of the frequency offset; and a sample data operator for adding or deleting data sample into/from a payload of the digital signal in response to the control of the timing controller.

The receiver of the invention may further comprise second to sixth correlators for multiplying the output signal from the differential operator by conjugate complex numbers of preset second to sixteenth reference symbols to produce correlation values, respectively.

According to an aspect of the invention, the differential operator may comprise: a delayer for delaying the digital signal for the sampling time interval; a main conjugate complex number producer for producing conjugate complex number of the delayed signal from the delayer; and a main multiplier for multiplying the conjugate complex number of the delayed signal from the main conjugate complex number producer by the digital signal.

According to another aspect of the invention, the first correlator may comprise: a first conjugate complex number producer for producing conjugate complex number of the preset first reference symbol; and a first multiplier for multiplying the output signal from the differential operator by the conjugate complex number of the preset first reference symbol to produce first correlation value between the output signal from the differential operator and the conjugate complex number of the first reference symbol.

According to other aspect of the invention, the timing controller may produce a difference between the frequency offset from the frequency offset detector and a preset frequency reference offset, control signal passing or data sample addition or deletion based upon the polarity of the frequency offset difference, and control the number of data samples to be added or deleted according to the magnitude of the frequency offset difference.

According to yet another aspect of the invention, the sample data operator may comprise: a switch for selecting one of a group consisting of a passing route, addition route and deletion route, in response to control on the signal passing or data sample addition or deletion by the timing controller; a passing router for passing a signal via the switch; a data adder for adding a preset first data sample to a digital signal from the switch, in response to the control by the time controller on the number of data samples to be added; and a data deleter for deleting a preset second data sample from a digital signal from the switch, in response to the control by the time controller on the number of data samples to be added.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram of a conventional IEEE 802.15.4 receiver;

DETAILED DESCRIPTION OF THE PREFERRED EMBODIMENTS

Hereinafter preferred embodiments of the present invention will be described in detail with reference to the accompanying drawings.

Preferred embodiments of the present invention will now be described in detail with reference to the accompanying drawings, in which the same reference signs will be used to designate the same or similar components throughout.

Figure 1:
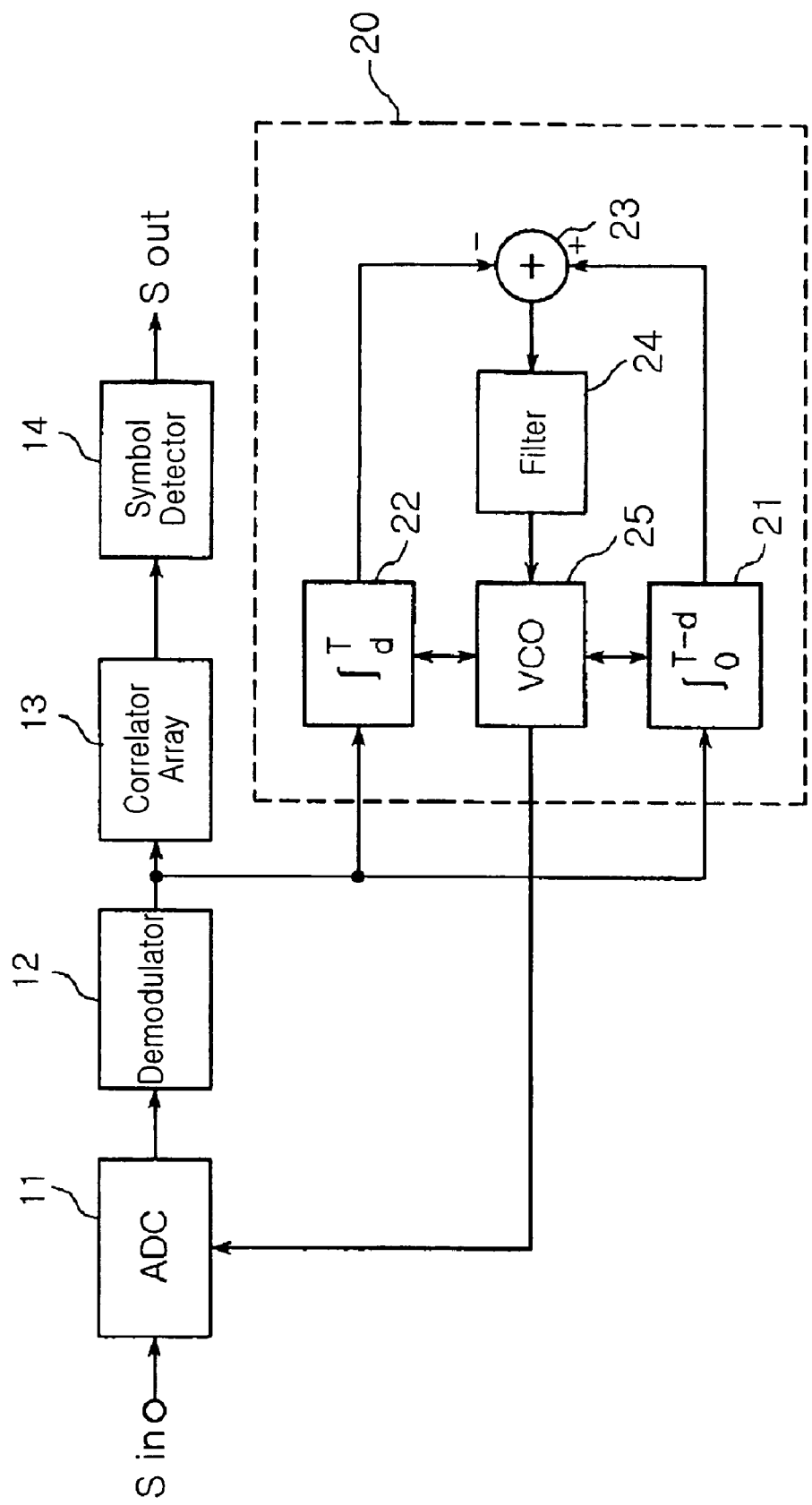
FIG. 1 is a front elevation view of a general side view LED package.
Figure 2:
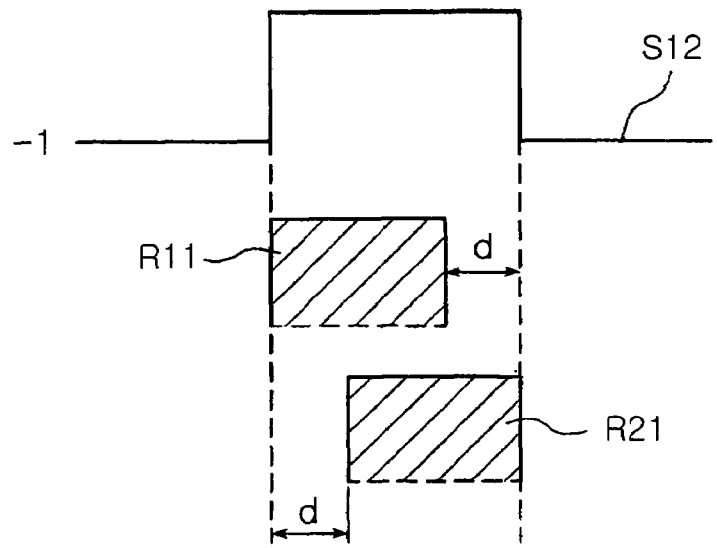
FIGS. 2a and 2b are diagrams for illustrating the operation of a conventional symbol timing recovery circuit.
Figure 2:
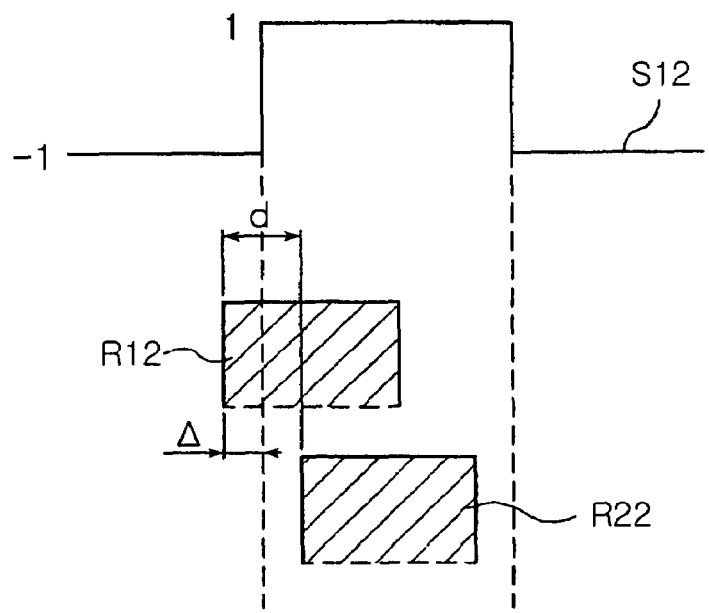
Figure 3:
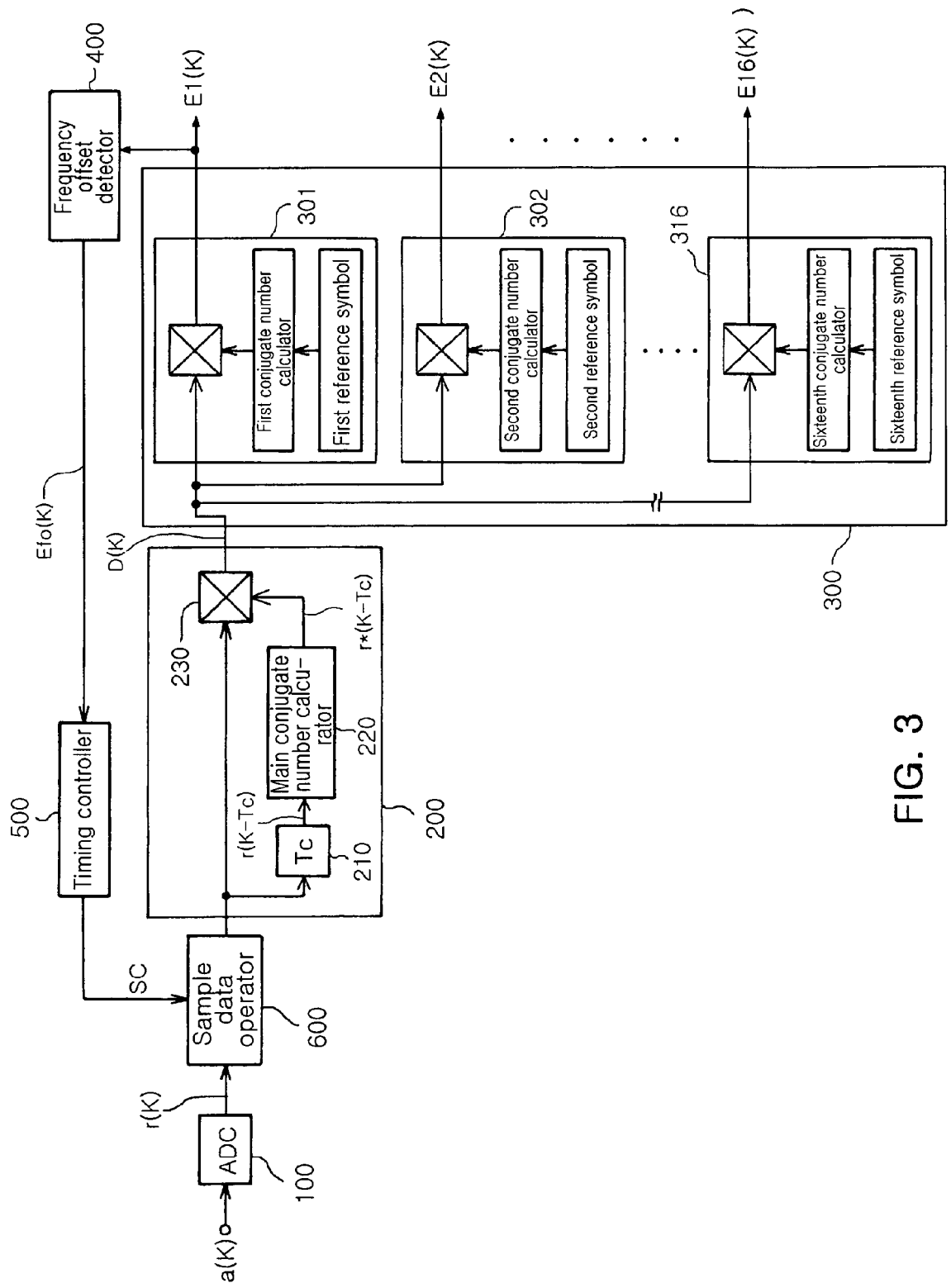
FIG. 3 is a block diagram of an IEEE 802.15.4 receiver of the invention.

FIG. 3 is a block diagram of an IEEE 802.15.4 receiver of the invention. Referring to FIG. 3, the receiver of the invention is an IEEE 802.15.4 receiver such as a ZigBee receiver, and includes an Analog/Digital (A/D) converter 100, a differential operator 200 for operating complex numbers, a correlator array 300, a frequency offset detector 400, a timing controller 500 and a sample data operator 600.

The A/D converter 100 samples and converts a received analog signal a(K) for a predetermined period into a digital signal r(K). The differential operator 200 delays the digital signal r(K) for a sampling time interval Tc, produces a conjugate complex number $r^*(K-Tc)$ of a delayed signal $r(K-Tc)$, and then multiplies the digital signal r(K) by the conjugate complex number $r^*(K-Tc)$. The correlator array 300 includes first to sixth correlators 301 to 316 that multiply an output signal D(K) from the differential operator 200 by conjugate complex numbers of preset first to sixteenth reference symbols Dr1(K) to Dr16(K), respectively. The frequency offset detector 400 produces an imaginary part from a first correlation value E1(K) from the first correlator 301, and by adding of the imaginary part during a preamble field interval of the received signal, detects entire frequency offset Efo in the preamble field interval. The timing controller 500 controls timing recovery of the received signal according to the magnitude of the frequency offset Efo. The sample data operator 600 adds or deletes a data sample into/from a payload of the digital signal r(K) in response to the control of the timing controller 500.

Figure 4:
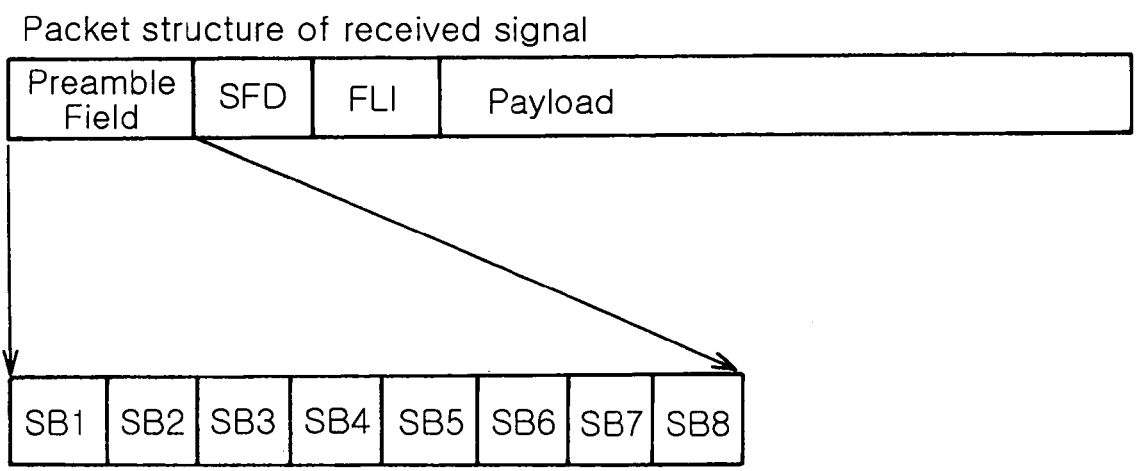
FIG. 4 is a diagram illustrating a packet structure of a signal received by the IEEE 802.15.4 receiver of the invention.

FIG. 4 is a packet diagram of a signal received by the IEEE 802.15.4 receiver of the invention. Referring to FIG. 4, the IEEE 802.15.4 receiver receives a signal having a packet structure as shown in FIG. 4. The packet structure of the received signal is constituted of 4-byte long preamble field DF1 having 8 symbols, start frame designation field SFD or DF2 designating a start frame, frame length indication field FLI or DF3 indicating frame length and payload field DF4 corresponding to actual data.

With the received signal packet structure as above, the receiver of the invention adds or deletes a data sample into/from the payload by using correlation value for 8 samples of preamble field in order to recover timing.

Referring to FIG. 3 again, the differential operator 200 includes a delayer for delaying the digital signal r(K) for the sampling time interval Tc, a main conjugate complex number producer 220 for producing conjugate complex number $r^*(K-Tc)$ from the delayed signal $r(K-Tc)$ that is delayed by the delayer 210 and a main multiplier 230 for multiplying the conjugate complex number $r^*(K-Tc)$ from the main conjugate complex number producer 220 by the digital signal r(K).

The first correlator 301 includes a first conjugate complex number producer and a first multiplier. The first conjugate complex number producer produces a conjugate complex number Dr1*(K) of the preset first reference symbol Dr1(K), and the first multiplier multiplies the output signal D(K) from the differential operator 200 by the conjugate complex number Dr1*(K) of the first reference symbol Dr1(K) to produce first correlation value E1(K) between the output signal D(K) from the differential operator 200 and the conjugate complex number Dr1*(K) of the first reference symbol Dr1(K).

The second to sixteenth correlators 302 to 316 are of the same structure as of the first correlator 301, and include second to sixteenth conjugate complex number producers and second to sixteenth multipliers, respectively.

Figure 5:
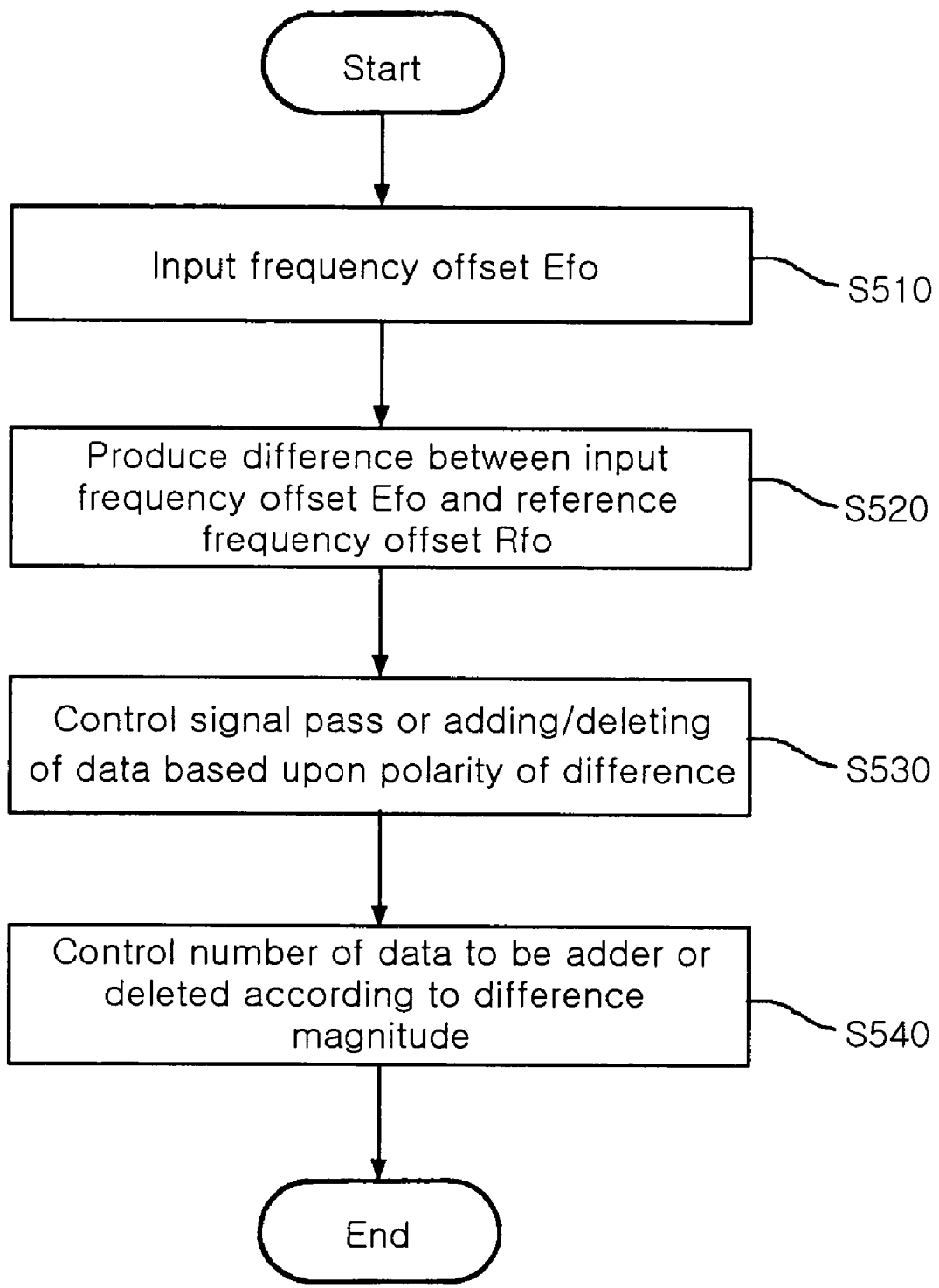
FIG. 5 is a flowchart of a timing controller of the invention.

FIG. 5 is a flowchart of the timing controller 500 of the invention. Referring to FIG. 5, the timing controller 500 is adapted to produce difference between frequency offset Efo from the frequency offset detector 400 and preset reference offset Rfo, control signal passing or adding/deleting of data sample according to the polarity of the frequency offset difference, and control the number of data samples to be added or deleted according to the magnitude of the frequency offset difference.

Figure 6:
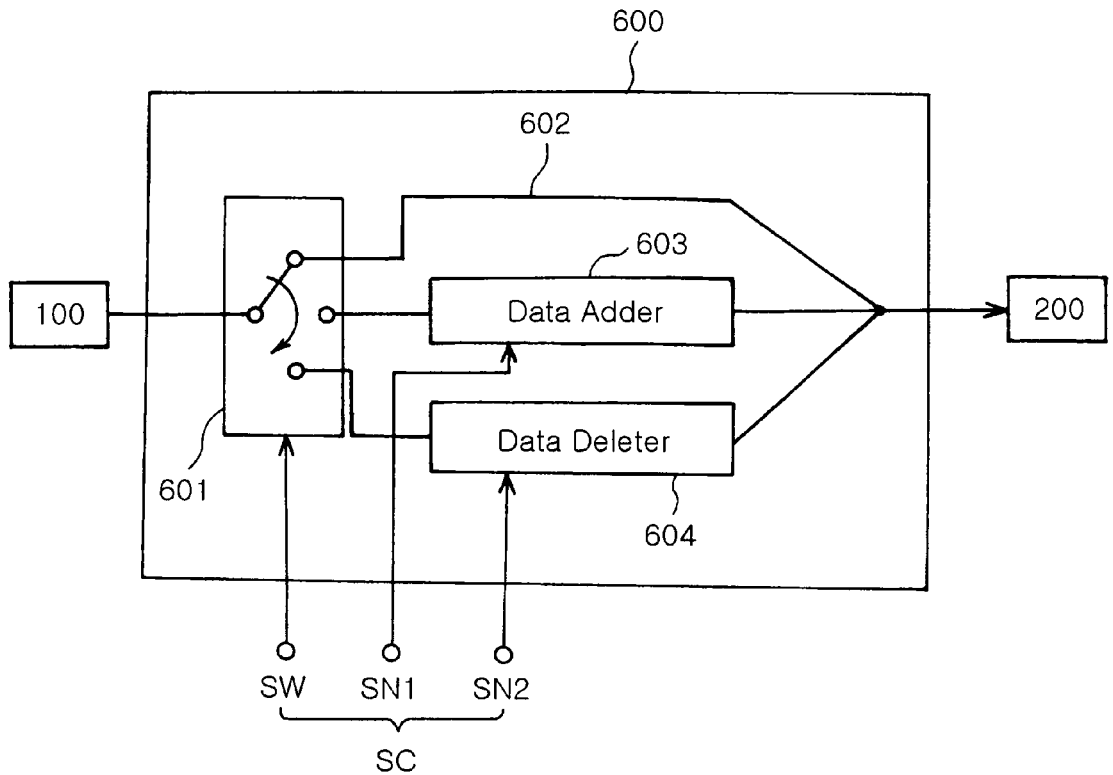
FIG. 6 is a diagram illustrating an internal structure of a sample data operator of the invention.

FIG. 6 is a diagram illustrating an internal structure of the sample data operator 600 of the invention. Referring to FIG. 6, the sample data operator 600 includes a switch 601 for selecting one of a passing route, addition route and deletion route according to the signal passing or adding or deleting of data sample by the timing controller 500, a pass router 602 for passing a data signal via the switch 601, a data adder 603 for adding a preset data sample to the digital signal received from the switch 601 in response to the timing controller 500 executing number control SN1 on data samples to be added, and a data deleter 604 for deleting a preset data sample from the digital signal received from the switch 601 in response to the timing controller 500 executing number control SN2 on data samples to be deleted.

Figure 7:
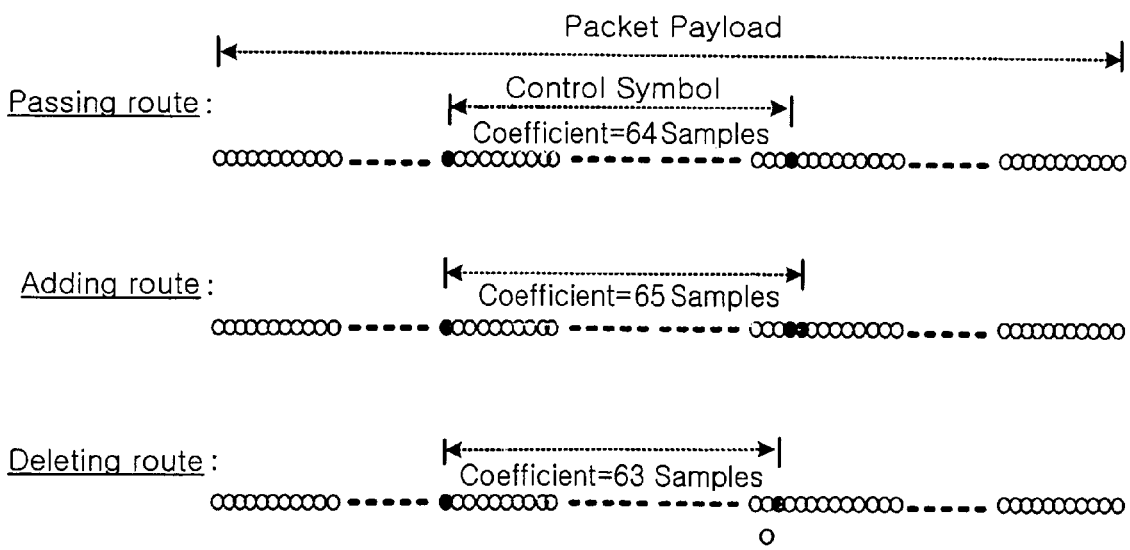
FIG. 7 is a diagram illustrating the operation of the sample data operator of the invention.

FIG. 7 is a diagram illustrating the operation of the sample data operator 600 of the invention. Referring to FIG. 7, the pass router passes a digital signal as it is, while the data adder adds a preset data sample in a preset position of a payload of the digital signal. On the other hand, the data deleter deletes a preset data sample from a preset position of the payload of the digital signal.

The operation and effect of the invention will now be described in detail with reference to the accompanying drawings.

Referring to FIGS. 3 to 7, the A/D converter 100 of the receiver of the invention samples and converts a receiver analog signal a(K) into a digital signal r(K) for a predetermined period. The digital signal r(K) can be defined in the form of complex number as expressed in Equation 1 below:

$$r(K)=s(K)e^{j\{2\pi\Delta f(k)+\Phi(K)\}} \quad \text{Equation 1,}$$

where s(k) indicates a received symbol (or sampled PN code), f(k) indicates frequency, and Φ(k) indicates phase.

Then, the differential operator 200 of the invention delays the digital signal r(K) for a sampling time interval Tc into a delayed signal r(K−Tc), produces conjugate complex number r*(K−Tc) of the delayed signal r(K−Tc), and multiplies the digital signal r(K) by the conjugate complex number r*(K−Tc) of the delayed signal r(K−Tc). This process will be described with reference to FIG. 3.

Referring to FIG. 3, the delayer 210 of the differential operator 200 delays the digital signal r(K) for the sampling time interval Tc in order to produce the delayed signal r(K−Tc) as expressed in Equation 2 below from the main conjugate complex number producer 220. Then, the main conjugate complex number producer 220 produces and outputs conjugate complex number r*(K−Tc) of the delayed signal r(K−Tc) as expressed in Equation 3 below to the main multiplier 230, which in turn multiplies the conjugate complex number r*(K−Tc) of the delayed signal from the main conjugate complex number producer 220 by the digital signal r(K) to output a signal D(K) as expressed in Equation 4 below.

$$r(K-Tc)=s(K-Tc)e^{j\{2\pi\Delta f(K-Tc)+\Phi(K-Tc)\}} \quad \text{Equation 2}$$

$$r^*(K-Tc)=s(K-Tc)e^{-j\{2\pi\Delta f(K-Tc)+\Phi(K-Tc)\}} \quad \text{Equation 3}$$

$$D(K) = r(K) \times r*(K - Tc) \quad \text{Equation 4}$$
$$= s(K)e^{j\{2\pi\Delta f(K)+\Phi(K)\}} \times$$
$$s*(K - Tc)e^{-j\{2\pi\Delta f(K-Tc)+\Phi(K-Tc)\}}$$
$$= s(K) \times s*(K - Tc)e^{j\{2\pi\Delta f(K-Tc)+\Phi(K)-\Phi(K-Tc)\}},$$
$$\text{if } \Phi(K) = \Phi(K - Tc),$$
$$= s(K) \times s*(K - Tc)e^{j\{2\pi\Delta f(Tc)\}},$$

Referring to FIG. 3 again, the first to sixteenth correlators 301 to 316 of the correlator array 300 of the invention multiply the output signal D(K) from the differential operator 200 by conjugate complex numbers of the preset first to sixteenth reference symbols Dr1(K) to Dr16(K) to produce correlation values E1(K) to E16(K), respectively.

Particularly, the first conjugate complex number producer of the first correlator 301 produces and outputs conjugate complex number Dr1(K) of the preset first reference symbol Dr1K) as expressed in Equation 5 below to the first multiplier. Then, the first multiplier multiplies the output signal D(K) from the differential operator 200 by the conjugate complex number Dr1*(K) of the first reference symbol Dr1(K) in order to produce and output first correlation value E1(K) between the output signal D(K) from the differential operator 200 and the conjugate complex number Dr1*(K) of the first reference symbol Dr1(K) as expressed in Equation 6 to the entire frequency offset detector 400 in a preamble field interval.

$$Dr1(K)=s(K)*(K-Tc)$$

$$Dr1*(K)=s*(K)s(K-Tc) \quad \text{Equation 5}$$

$$E1(K) = D(K) \times Dr1*(K) \quad \text{Equation 6}$$
$$= s(K)s*(K - Tc)e^{j\{2\pi\Delta f(Tc)\}} \times s*(K)s(K - Tc)$$
$$= |s(K)|^2|s(K - Tc)|^2 e^{j\{2\pi\Delta f(Tc)\}}$$
$$(\text{if } |s(K)|^2 = 1, |s(K - Tc)|^2 = 1)$$
$$= e^{j\{2\pi\Delta f(Tc)\}}$$
$$= \cos\{2\pi\Delta f(Tc)\} + j\sin\{2\pi\Delta f(Tc)\}$$

As seen in Equation 6 above, it is apparent that the first correlation value E1(K) from the first correlator 301 contains frequency offset value sin(2πΔfTc).

Then, the frequency offset detector 400 produces imaginary part sin(2ΠΔfTc) of the first correlation value E1(K) from the first correlator 301, and adds the produced imaginary part during the preamble field interval of the received signal as shown in FIG. 4 in order to detect and output the entire frequency offset Efo in the preamble field interval to the timing controller 500. The frequency offset Efo can be calculated as in Equation 7 below:

$$Efo \sum_{K=1}^{K=End\ of\ preamble} \sin\{2\pi\Delta f(Tc)\}, \quad \text{Equation 7}$$

wherein eight (8) symbols in the preamble field DF1 are counted during the preamble field DF1 interval, as shown in FIG. 4, to make adding of frequency offset for the eight symbols.

Then, the timing controller 500 controls timing recovery of the received signal according to the magnitude of the frequency offset Efo. This will be described with reference to FIG. 5 as follows.

Referring to FIG. 5, the timing controller 500 produces difference Efo-Rfo between the frequency offset Efo received from the frequency offset detector 400 and the preset frequency reference offset Rfo in S510 and S520, controls signal passing (if difference=0) or data adding (if difference<0) or deleting (if difference>0) according to the polarity of the frequency offset in S530, and controls the number of data samples to be added or deleted according to the magnitude of the frequency offset difference in S540.

The sample data operator 600 passes the digital signal, adds present data sample to the payload of the digital signal r(K) or deletes preset data from the payload of the digital signal r(K) in response to the control SC (SW, SN1, SN2) of the timing controller 500.

Referring to FIGS. 6 and 7, the switch 601 of the sample data operator 600 shown in FIG. 6 selects one of a passing route, addition route and deletion route in response to the timing controller 500 executing signal passing, data sample addition and data sample deletion controls SW.

If the passing route P1 is selected by the switch 601, the pass router 602 connected to the passing route P1 as shown in FIG. 7 passes the digital signal from the switch 601 as it is.

If the addition route P2 is selected by the switch 601, the data adder 603 connected to the addition route P2 as shown in FIG. 7 adds a preset data sample in a preset position of the payload of the digital signal from the switch 601 in response to the data sample number control SN1 by the timing controller 500. In this case, the preset data may be zero (0), or any data located before or after the position to be added.

If the deletion route P3 is selected by the switch 601, the data deleter 604 connected to the deletion route P3 deletes a data sample from a preset position of the payload of the digital signal from the switch 601, in response to the sample number control SN2 to delete data samples by the timing controller 500.

For example, if 64 samples are located in the preset position, adding one data sample in the preset position makes 65 samples, but deleting one data sample from the preset position makes 63 samples.

According to the present invention as described hereinbefore, an IEEE 802.15.4 receiver of for example ZigBee can detect frequency offset of a received signal by using symbol correlation between the received signal and a reference signal, and increase/decrease the number of data samples according to the detected frequency offset, thereby recovering symbol timing of the received signal.

Furthermore, unlike complicated conventional structures of for example PLL including an integrator, multiplier, comparator and VCO, the present invention can realize a simple receiver structure by using a simple timing recovery circuit, thereby saving the manufacturing cost.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. A receiver having a digital timing recovery function, comprising:
    an analog-digital converter for sampling and converting a received analog signal at a predetermined sampling time period into a digital signal;
    a differential operator for delaying the digital signal for a sampling time interval to produce conjugate complex number of the delayed signal and multiplying the digital signal by the conjugate complex number;
    a first correlator for multiplying an output signal from the differential operator by conjugate complex number of a preset first reference symbol to produce first correlation value;
    a frequency offset detector for producing an imaginary part from the first correlation value and adding the imaginary part during a preamble field interval of the received analog signal to detect entire frequency offset in the preamble field interval;
    a timing controller for controlling timing recovery of the received analog signal according to the magnitude of the frequency offset; and
    a sample data operator for adding or deleting data sample into/from a payload of the digital signal in response to the control of the timing controller.

2. The receiver according to claim 1, further comprising second to sixth correlators for multiplying the output signal from the differential operator by conjugate complex numbers of preset second to sixteenth reference symbols to produce correlation values, respectively.

3. The receiver according to claim 1, wherein the differential operator comprises:
    a delayer for delaying the digital signal for the sampling time interval;
    a main conjugate complex number producer for producing conjugate complex number of the delayed signal from the delayer; and
    a main multiplier for multiplying the conjugate complex number of the delayed signal from the main conjugate complex number producer by the digital signal.

4. The receiver according to claim 3, wherein the first correlator comprises:
    a first conjugate complex number producer for producing conjugate complex number of the preset first reference symbol; and
    a first multiplier for multiplying the output signal from the differential operator by the conjugate complex number of the preset first reference symbol to produce first correlation value between the output signal from the differential operator and the conjugate complex number of the first reference symbol.

5. The receiver according to claim 3, wherein the timing controller is adapted to produce a difference between the frequency offset from the frequency offset detector and a preset frequency reference offset, control signal passing or data sample addition or deletion based upon the polarity of the frequency offset difference, and control the number of data samples to be added or deleted according to the magnitude of the frequency offset difference.

6. The receiver according to claim 5, wherein the sample data operator comprises:

a switch for selecting one of a group consisting of a passing route, addition route and deletion route, in response to control on the signal passing or data sample addition or deletion by the timing controller;

a pass router for passing a signal via the switch;

a data adder for adding a preset first data sample to a digital signal from the switch, in response to the control by the time controller on the number of data samples to be added; and a data deleter for deleting a preset second data sample from a digital signal from the switch, in response to the control by the time controller on the number of data samples to be added.

* * * * *